United States Patent

[11] 3,611,285

| [72] | Inventor | Giorgio Eggstein<br>Ospedaletti/San Remo, Italy |
|---|---|---|
| [21] | Appl. No. | 742,253 |
| [22] | Filed | July 3, 1968 |
| [45] | Patented | Oct. 5, 1971 |
| [73] | Assignee | Ernst Heinkel Aktiengesellschaft<br>Stuttgart-Zuffenhausen, Germany |
| [32] | Priority | July 5, 1967 |
| [33] | | Germany |
| [31] | | P 16 30 037.1 |

[54] SIGNAL ARRANGEMENT FOR HYDRAULIC BRAKES
6 Claims, 1 Drawing Fig.
[52] U.S. Cl. .................................................. 340/59,
340/244 HBF
[51] Int. Cl. .................................................. B60t 17/22
[50] Field of Search ......................................... 340/244 A,
244 HBF, 59

[56] References Cited
UNITED STATES PATENTS
1,496,306  6/1924  Duhamel ..................... 340/59
2,615,105 10/1952  Whitney ....................... 340/59
2,744,177  5/1956  Barber ......................... 340/59
3,436,727  4/1969  Pagano ........................ 340/59
3,479,639 11/1969  Randol ........................ 340/59

*Primary Examiner*—John W. Caldwell
*Assistant Examiner*—Howard Cohen
*Attorney*—Michael S. Striker ABSTRACT: Signal arrangement for hydraulic brakes including an upright refill container adapted to be filled with a brake fluid, such as oil, the container being connected to and communicating at its bottom end with a braking cylinder and having a top end closed by a cover constructed to form a downwardly extending float housing communicating at its bottom end with the interior of the container and a contact housing upwardly spaced from the float housing, a float in the interior of said float housing, contact means in the contact housing and connected to the float to be moved thereby between an open and a closed position depending on the vertical position of the float, and a signal device in circuit with the contact means to be actuated when the latter are moved to the closed position.

PATENTED OCT 5 1971
3,611,285
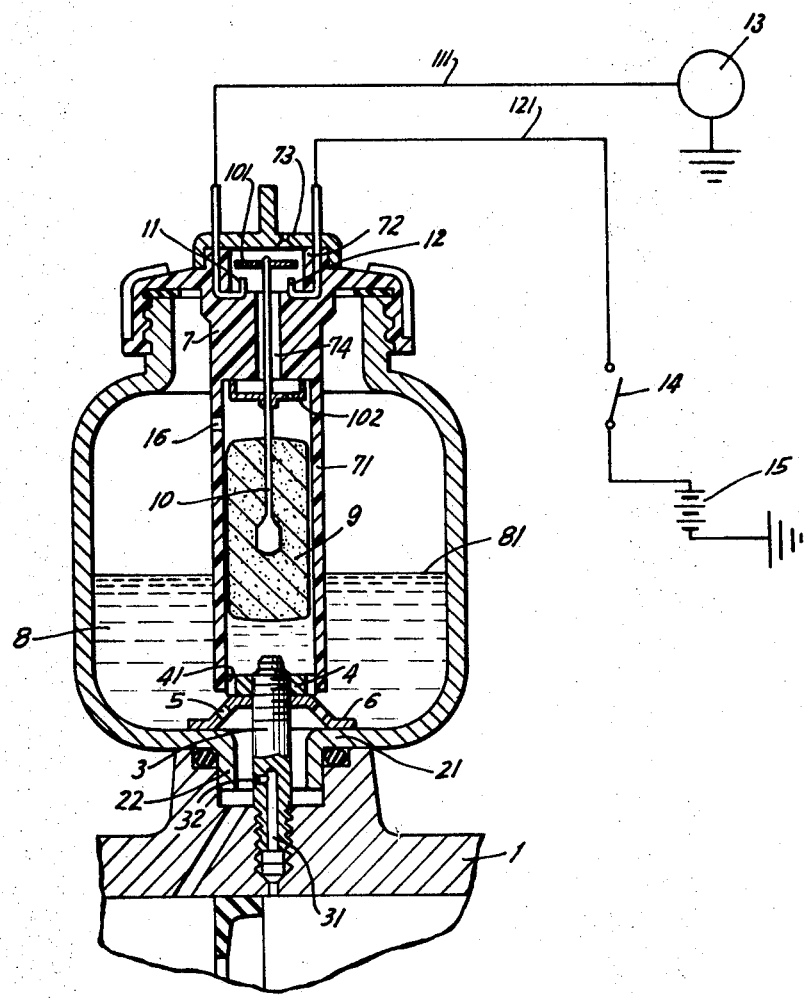
INVENTOR
GIORGIO EGGSTEIN
BY
Michael S. Striker
ATTORNEY

SIGNAL ARRANGEMENT FOR HYDRAULIC BRAKES

BACKGROUND OF THE INVENTION

The present invention relates to a signal arrangement for hydraulic brakes, and more specifically to a signal arrangement for the refill container of a hydraulic brake of a vehicle in which an alarm signal is actuated by a float in the refill container.

Signal arrangements for the fuel tank of automotive vehicles are known in which a light signal is actuated when the level of fuel in the tank drops below a certain minimum. Lately laws have been enacted in various countries which require similar signal arrangements for the refill container serving for replenishing the hydraulic fluid, such as oil, in the braking cylinders of vehicles. It is therefore necessary to provide also signal arrangements for hydraulic brakes.

The problems connected with such a signal arrangement differ essentially from those connected with fuel tanks. First of all, the refill containers for hydraulic brakes have a much smaller volume than fuel tanks. The buoyancy force of the float is therefore necessarily smaller than that provided in floats of fuel tanks, and this force cannot be transmitted through lever arms. The space available for the float is extremely small, especially since the oil serving as brake fluid should not come in contact with the contact means of the arrangement, since otherwise proper contact would be prevented. It is therefore necessary to separate the brake fluid form the contact means. Therefore, it is also necessary to arrange the float in a float housing which closely surrounds the float, and to exactly position the float housing so that the float movable therein will not become jammed.

It is an object of the present invention to provide a signal arrangement of the aforementioned kind in which the float is properly guided and in which the oil forming the brake fluid is prevented from coming into contact with the contact means.

It is a further object of the present invention to provide a signal arrangement of the aforementioned kind which is composed of relatively few and simple parts which can be easily assembled with and disassembled from each other, if cleaning or replacing any of the parts becomes necessary.

SUMMARY OF THE INVENTION

With these objects in view, the signal arrangement according to the present invention for hydraulic brakes having a braking cylinder, mainly comprises an upright replenishing container adapted to be filled up to a given level with a braking fluid, the container having a bottom end communicating with and being connected to the braking cylinder and an open upper end, cover means releasably connected to and closing the upper open end of the container, the cover means forming a downwardly extending float housing projecting into the container below the level of fluid therein and having an open bottom end, a contact housing upwardly spaced from the float housing, and a bore extending between the float housing and the contact housing, a float floating in the fluid in the float housing and being movable in substantial vertical direction between an inactive upper position and an active lower position, contact means in the contact housing movable between an open and a closed position, connecting means extending through the aforementioned bore and connecting the float with the contact means for moving the latter to the open position when the float is in the upper inactive position and for moving said contact means to the closed position when the float is in the lower active position, and an electric circuit including signal means connected to the contact means for actuating the signal means when the contact means are in the closed position.

The contact means preferably comprise a pair of spaced stationary contacts and a movable contact connected to the upper end of a vertical rod which extends through the aforementioned bore and which is connected at its lower end to the float for moving in vertical direction therewith.

In a preferred construction according to the present invention, the lower open end of the float housing extends over the head of screw means, fastening the replenishing container to the braking cylinder so that the float housing is centered by the head of this screw and the fastening screw is preferably provided with a restricted passage therethrough while the head of the screw is formed with passages so that the braking fluid may pass from the interior of the container into the float housing. A tubular extension may be formed at the bottom of the container through which the fastening screw means extend with ample clearance, and the screw means may be in the form of a stud bolt screwed at its lower end into a threaded bore in the wall of the braking cylinder and a nut screwed on the upper end of the bolt may serve, not only to center the lower end of the float housing, but also to press a dished member about the bolt against the bottom wall of the container so as to fasten the latter to the braking cylinder. The dished member is formed with a plurality of openings therethrough, and the restricted passage through the bolt may be in form of an axial bore which communicates at the lower end with the interior of the braking cylinder and through a cross bore with the interior of the tubular extension on the bottom wall of the container.

BRIEF DESCRIPTION OF THE DRAWING

The drawing is a partially schematic, axial cross section through the signal according to the present invention.

DESCRIPTION OF THE PREFERRED EMBODIMENTS

Referring now to the drawing it will be seen that the signal arrangement according to the present invention comprises an upright replenishing container 2 adapted to be filled up to a given level 81 with a braking fluid, for instance, oil, and the container 2 is fastened by means of a stud bolt 3 screwed with its lower end into a correspondingly threaded bore of a braking cylinder 1, only partially shown in the drawing, a nut 4 screwed onto the upper end of the bolt, and a dished member 6 formed with a plurality of openings 5 therethrough and pressed by the nut 4 with an annular bottom portion against the bottom wall 21 of the container. Cover means 7 are releasably connected by being, for instance, threadingly engaged, with the upper open end of the container to close the latter at its upper end. The cover means 7 forms a central, downwardly extending float housing 71, having a lower open end extending over the nut 4 to be centered by the latter, and the cover means 7 forms further a contact housing 72 coaxially arranged and upwardly spaced from the float housing 71 and having an upper open end closed by a cover 73. The interior of the float housing 71 and that of the contact housing 72 are connected with each other by a coaxial bore 74. A tubular extension 22 extends downwardly from the bottom wall 21 of the replenishing container 2 and the stud bolt 3 extends with ample clearance through this tubular extension. The stud bolt 3 is formed in a lower portion thereof with an axial bore 31 of small diameter which communicates with a corresponding bore in the braking cylinder 1, and a cross bore 32 extends from the axial bore 31 to the periphery of the bolt to communicate with the annular space between the outer bolt surface and the inner surface of the tubular extension 22. The oil space 8 in the interior of the container 2 communicates, therefore, through the openings 5 in the dished member 6, the cross bore 32, and axial bore 31 in the bolt 3 with the interior of the braking cylinder 1. Through passages 47 formed in the nut 4, communication is also provided between the oil space 8 and the interior of the float housing 71.

A float 9 is coaxially arranged with small clearance in the float housing 71 and the float 9 may be formed from cork or by hollow plastic body. A rod 10 coaxially arranged with the float 9 is fastened, in any convenient manner, at the lower end thereof to the float 9 and the rod 10 projects from the float with clearance through the bore 74 into the contact housing 72. Contact means are arranged in the contact housing movable between an open and a closed position and these contact means may comprise a pair of spaced stationary contacts 11 and 12 and a movable contact 101 in form of a plate fastened to the upper end of the rod 10. The rod 10 carries further fixedly connected thereto a closure plate 102 in the interior of the contact housing 71 which closure plate engages, in the position of the float 9 shown in the drawing, with an annular upwardly extending edge thereof the upper face of the contact housing about the bore 74. The stationary contacts 11 and 12 are respectively connected by conductors 111 and 121 with a signal lamp 13 and a main switch 14 connected to the battery 15 of the vehicle. An opening 16 is formed in an upper portion of the wall, forming the float housing 71 to provide communication between the air space in the float housing and in the air space in the container 2.

The above-described signal arrangement operates as follows:

As long as the level 81 of the oil in the container 2 will not drop considerably below the level 81, as indicated in the drawing, the float 9 floating on the oil will maintain the movable contact 101 upwardly spaced from the upper ends of the stationary contacts 11 and 12. However, if the oil in the container 2 is used up or if the hydraulic pressure circuit is out of action either through leakage, or, as happens more often, when the hydraulic oil in the braking cylinder is heated up nearly to its boiling point, the float 9 will move downwardly until the contact 101 will make contact with the stationary contacts 11 and 12 to close thereby the circuit connected to the stationary contacts and to energize the lamp 13.

As long as the level of the oil in the container does not drop below the level indicated at 81, the closure plate 102 will be maintained in the position as shown in the drawing to close thereby the bottom end of the bore 74 to prevent thereby the passing of oil drops or oil vapors through this bore into contact housing 72.

The construction of the piston movable in the braking cylinder during the braking action toward the right, as viewed in the figure, and the connection of the interior of the tubular extension 22 with the cylinder spaced toward the left of the piston, are standard constructions, not forming part of the present invention.

It will be understood that each of the elements described above, or two or more together, may also find a useful application in other types of signal arrangements for hydraulic brakes differing from the types described above.

While the invention has been illustrated and described as embodied in a signal arrangement for hydraulic brakes indicating the oil level in a replenishing container for replenishing oil in the braking cylinder, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention; and, therefore, such adaptations should and are intended to be comprehended within the meaning and range of equivalence of the following claims.

What is claimed as new and desired to be protected by Letters Patent is set forth in the appended.

1. A signal arrangement for hydraulic brakes having a braking cylinder, said signal arrangement comprising, in combination, an upright replenishing container adapted to be filled up to a given level with a braking fluid, said container having a bottom end communicating with and being connected to said braking cylinder and an open upper end; cover means connected to and closing said upper open end of said container, said cover means forming a downwardly extending float housing projecting into said container below the level of the fluid therein and having an open bottom end, a contact housing upwardly spaced from said float housing, and an elongated bore of a diameter considerably smaller than the inner diameter of said float housing and said contact housing; a float floating on the fluid in said float housing and closely guided in the latter in substantially vertical direction between an inactive upper position and an active lower position; a pair of transversely spaced stationary contact members in said contact housing; an elongated rod fixed at the lower end thereof to said float and extending upwardly therefrom through said bore into said float housing; an electric circuit including signal means connected to said stationary contact members; a movable contact member fixed to the upper end of said rod in said contact housing normally upwardly spaced from said stationary contact members and engaging the latter to close said circuit and to actuate said signal means when said float moves to its lower active position; and a closure plate fixed to said rod in said float housing and engaging the latter at an annular portion about the lower end of said bore when said float is in said upper inactive position.

2. A signal arrangement for hydraulic brakes having a braking cylinder, said signal arrangement comprising, in combination, an upright replenishing container adapted to be filled up to a given level with a braking fluid, said container having a bottom end communicating with and being connected to said braking cylinder and an open upper end; cover means connected to and closing said upper open end of said container, said cover means forming a downwardly extending float housing projecting into said container below the level of the fluid therein and having an open bottom end, a contact housing upwardly spaced from said float housing, and an elongated bore of a diameter considerably smaller than the inner diameter of said float housing and said contact housing; a float floating on the fluid in said float housing and closely guided in the latter in substantially vertical direction between an inactive upper position and an active lower position; a pair of transversely spaced stationary contact members in said contact housing; an elongated rod fixed at the lower end thereof to said float and extending upwardly therefrom through said bore into said float housing; an electric circuit including signal means connected to said stationary contact members; a movable contact member fixed to the upper end of said rod in said contact housing normally upwardly spaced from said stationary contact members and engaging the latter to close said circuit and to actuate said signal means when said float moves to its lower active position; and screw means connecting said bottom end of said container to said braking cylinder, said screw means having a head and said open bottom end of said float housing extending over said head to be centered by the latter.

3. A signal arrangement as defined in claim 2, wherein said screw means is formed with restricted passage means providing communication between the interior of said float housing, the interior of said container and that of said braking cylinder.

4. A signal arrangement for hydraulic brakes having a braking cylinder, said signal arrangement comprising, in combination, an upright replenishing container adapted to be filled up to a given level with a braking fluid, said container having at its bottom end a bottom wall and a tubular portion downwardly projecting from said bottom wall and communicating with said braking cylinder; screw means extending through said tubular portion radially spaced therefrom for connecting said container to said braking cylinder; cover means connected to and closing said upper open end of said container, said cover means forming a downwardly extending float housing projecting into said container below the level of the fluid therein and having an open bottom end, a contact housing upwardly spaced from said float housing, and an elongated bore of a diameter considerably smaller than the inner diameter of said float housing and said contact housing; a float floating on the fluid in said float housing and closely guided in the latter in substantially vertical direction between an inactive upper position and an active lower position; a pair of transversely spaced stationary contact members in said contact housing; an elongated rod fixed at the lower end thereof to said float and extending upwardly therefrom through said bore into said float housing; an electric circuit including signal means connected to said stationary contact members; and a movable contact member fixed to the upper end of said rod in said contact housing normally upwardly spaced from said stationary contact members and engaging the latter to close said circuit and to actuate said signal means when said float moves to its lower active position.

5. A signal arrangement as defined in claim 4, wherein said screw means comprises a stud bolt threaded at its lower end into a threaded bore in the wall of said braking cylinder and a nut screwed onto the upper end of said bolt, and including a dished member about said bolt between said nut and said bottom wall of said container and having a lower annular portion pressed by said nut against said bottom wall about said tubular portion, said dished member being formed with at least one opening therethrough.

6. A signal arrangement as defined in claim 5, wherein said open bottom end of said float housing extends over said nut to be centered by the latter, said nut being provided with passage means providing communication between the interior of the container and the interior of said float housing, and said bolt being provided with a small diameter axial bore extending from the bottom end of the bolt partly into the latter and with a cross bore providing communication between said axial bore and the space in the tubular portion of the container about said bolt.